United States Patent
Stark et al.

(10) Patent No.: US 11,541,336 B2
(45) Date of Patent: Jan. 3, 2023

(54) FILTER ELEMENT, FILTER SYSTEM COMPRISING A FILTER ELEMENT, AND METHOD FOR PRODUCING A FILTER ELEMENT

(71) Applicant: MANN+HUMMEL GmbH, Ludwigsburg (DE)

(72) Inventors: Dennis Stark, Mauer (DE); Duc Cuong Nguyen, Laatzen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 640 days.

(21) Appl. No.: 16/531,048

(22) Filed: Aug. 3, 2019

(65) Prior Publication Data
US 2020/0023296 A1 Jan. 23, 2020

Related U.S. Application Data

(63) Continuation of application No. PCT/EP2018/050965, filed on Jan. 16, 2018.

(30) Foreign Application Priority Data

Feb. 3, 2017 (DE) .......................... 102017000976.7

(51) Int. Cl.
| | |
|---|---|
| *B01D 35/143* | (2006.01) |
| *B01D 46/00* | (2022.01) |
| *B01D 46/42* | (2006.01) |
| *F02M 35/024* | (2006.01) |

(52) U.S. Cl.
CPC ....... *B01D 35/143* (2013.01); *B01D 46/0086* (2013.01); *B01D 46/429* (2013.01); *B01D 2201/56* (2013.01); *F02M 35/02425* (2013.01)

(58) Field of Classification Search
None
See application file for complete search history.

(56) References Cited

U.S. PATENT DOCUMENTS

| | | | |
|---|---|---|---|
| 2006/0168843 A1 | 8/2006 | Zlotos | |
| 2009/0243395 A1* | 10/2009 | Burke | H01Q 9/16 307/104 |
| 2014/0094534 A1* | 4/2014 | Buckley | C08G 71/04 521/156 |
| 2018/0245548 A1* | 8/2018 | Varghese | B01D 46/2414 |

FOREIGN PATENT DOCUMENTS

| | | |
|---|---|---|
| CN | 205287916 U | 6/2016 |
| DE | 102008027279 A1 | 4/2009 |
| DE | 102008009242 A1 | 8/2009 |

(Continued)

OTHER PUBLICATIONS

RFID inc, Specialty RFID tags, all pages (Year: 2020).*

(Continued)

*Primary Examiner* — Christopher P Jones
*Assistant Examiner* — Brit E. Anbacht

(57) ABSTRACT

A filter element has a filter body which is closed on at least one end face by an end disc, wherein the end disc is formed from a potting compound, and has a stabilization device which is surrounded at least in some areas by the potting compound. At least one data storage unit is arranged on or in the stabilization device.

9 Claims, 5 Drawing Sheets

(56) References Cited

FOREIGN PATENT DOCUMENTS

| | | |
|---|---|---|
| DE | 102009050254 A1 | 5/2011 |
| DE | 102010044258 A1 | 5/2011 |
| DE | 102013004112 A1 | 9/2014 |
| DE | 202015001147 U1 | 3/2015 |
| DE | 102014007719 A1 | 12/2015 |
| EP | 0934225 B1 | 8/1999 |
| EP | 1246679 B1 | 10/2002 |
| EP | 1498171 B1 | 1/2005 |
| EP | 1559979 A2 | 8/2005 |
| EP | 1763393 A1 | 12/2005 |
| EP | 1693098 B1 | 8/2006 |
| EP | 1693560 B1 | 8/2006 |
| EP | 1763395 B1 | 3/2007 |
| EP | 1844836 A2 | 10/2007 |
| EP | 1844838 A2 | 10/2007 |
| EP | 1850941 B1 | 11/2007 |
| EP | 1985351 A1 | 10/2008 |
| EP | 2222384 A1 | 7/2009 |
| EP | 2257938 A2 | 10/2009 |
| EP | 2237848 B1 | 10/2010 |
| EP | 2802398 A1 | 7/2013 |
| JP | 2008083792 A | 4/2008 |
| WO | 0040322 A1 | 7/2000 |

OTHER PUBLICATIONS

RFID inc, UHF Product Data Sheet V1.2 Fixed, prior 2016 as per google search results most likely Mar. 2013 based on "version" at bottom, p. 18 (Year: 2013).*

* cited by examiner

FILTER ELEMENT, FILTER SYSTEM COMPRISING A FILTER ELEMENT, AND METHOD FOR PRODUCING A FILTER ELEMENT

TECHNICAL FIELD

The invention relates to a filter element for filtering a fluid, a filter system having a filter element as well as a method for producing a filter element. Such filter elements are re-placeably insertable into filter housings.

BACKGROUND ART

DE 10 2008 009 242 A1 describes a filter element for filtering fluids such as hydraulic fluids or gases, wherein the filter element can be accommodated in a filter housing with an inlet point for the fluid to be filtered and an outlet point for the filtered fluid. The filter element features a data storage unit. Data stored in the data storage unit can be read electronically from the data storage unit by means of a reading and/or recording device also referred to as a reader and located outside the filter element. An antenna extending outside the data storage unit is provided for signal coupling between the data storage unit and the reader, wherein the antenna extends sectionwise around a longitudinal axis of the filter element and thereby assuring a signal coupling between the data storage unit and the reading and/or recording device independent of the angular position of the filter element and the data storage unit attached thereto.

Furthermore, WO 2005/113112 A1 describes a filter apparatus which comprises a filter cartridge with filter media and an RFID transponder connected to the filter media. The antenna arrangement is arranged on a filter housing. The antenna arrangement comprises an antenna conductor, which is electrically connected to a male connector. The male connector is intended for the antenna to be electrically connected to a transponder reader, which is located at a distance from the filter housing. A round antenna on the housing side or on the filter head side is provided on the filter apparatus.

SUMMARY

One object of the invention is to create a filter element, in particular for filtering air, which makes it possible to integrate a data storage unit in a simple and reliable way.

A further object of the invention is to create a filter system, in particular an air filter system, having such a filter element with data storage unit, which allows an electronic communication with the data storage unit in a reliable way.

A further object of the invention is to create a method for producing such a filter element.

The above-mentioned object is solved by means of a filter element (also called filter insert) for filtering a fluid, in particular for filtering air, comprising a filter body, in which at least one preferably contactless readable data storage unit, which is at least partially and preferably completely surrounded by a potting compound, is arranged on or in a stabilization device.

A further object is solved by means of a filter system, in particular an air filter system, comprising at least one such filter element in a filter housing, wherein an antenna for electronically communicating with the data storage unit is arranged on the filter housing.

A further object is solved by means of a method for producing a filter element for a filter system, comprising at least the steps:

Joining a filter body with at least one stabilization device,
Arranging the data storage unit on or in the stabilization device,
Forming an end disc on at least one end face of the filter body by at least partially overmoulding the stabilization device with a potting compound, wherein the data storage unit is at least partially surrounded by the potting compound.

Favourable embodiments and advantages of the invention will become apparent from the further claims, the description and the drawing.

A filter element for filtering a fluid, in particular for filtering air, is proposed, having a filter body which is closed on at least one end face by an end disc, wherein the end disc is formed from a potting compound, and features a stabilization device which is surrounded at least in some areas by the potting compound. At least one data storage unit, which is at least partially surrounded by the potting compound, is preferably arranged eccentrically on or in the stabilization device.

With the filter element according to the invention, an in particular hollow cylindrical filter body is closed at least on one end face by means of an end disc which is formed from a potting compound and consists, for example, preferably of foamed plastic such as foamed polyurethane (PUR). To reinforce the end disc, a plastic stabilization device, for example a stabilization ring, is at least partially overmoulded with the potting compound. For further reinforcing, the stabilization device can have a support tube which reinforces the filter body from the inside. The support tube can also be at least partially overmoulded. A data storage unit, such as a common RFID transponder comprising specific data of the filter element, can be arranged in different positions on the stabilization device. It is advantageous if the data storage unit is arranged in a fixed position on or in the stabilization device so that the data storage unit remains on the filter element from manufacture through assembly/disassembly to disposal in the filter system and is not lost. For this purpose, it is appropriate if the data storage unit is at least partially surrounded by the potting compound. So that the data storage unit cannot float during the potting or foaming process of the plastic compound and then only floats on the surface of the potting compound, it is advantageous if the data storage unit is held firmly on or in the stabilization device. For this purpose, the stabilization device may have a possible receptacle, such as a recess, at various points for the data storage unit. The receptacle is preferably arranged eccentrically in a predetermined position of the rotation angle. The receptacle preferably has clip, clamping or latching elements which are elastically deformable for a short time when the data storage unit is inserted and which hold the data storage unit in the inserted, in particular clipped, clamped or latched state, in particular with positive locking. The data storage unit is therefore preferably clipped or locked into the receptacle. Alternatively, or in addition, the data storage unit may be glued in or to the receptacle. In this way, the data storage unit is held firmly during the potting process and is unable to change its position. Since the data storage unit is at least partially surrounded by the potting compound, it is firmly connected to the filter element after the potting compound has cured.

For example, the data storage unit may be flat and/or round or polygonal, in particular in the shape of a round or polygonal coin (coin-shaped) or rod-shaped. The shape is preferably determined by a housing of the data storage unit, i.e. a housing of the data storage unit preferably has one of the above mentioned shapes. The data storage unit can also be arranged on the support tube. The filter element is expediently attached to or at least close below an exterior side of the filter element, since the range of the data storage unit, which can be designed as preferably passive transponder, in particular as an RFID transponder, is relatively small and only a few centimeters.

Data that can be stored in the data storage unit can advantageously comprise production data in the as-delivered state of the filter element, such as batch number etc., to identify the filter element. However, operating data such as running time, machine type, load status and the like can also be stored in it. The data can also be read out by the filter element and sent, for example, to the engine control unit of an internal combustion engine in order to adapt the engine control accordingly. The read unit for the data storage unit can advantageously be integrated into the engine control unit. For example, filter elements with lower performance can be identified and the running time until the next maintenance can be adjusted accordingly.

According to an advantageous embodiment, the stabilization device may feature a central support tube at one end of which a stabilization ring is arranged that opens towards the support tube, wherein the stabilization ring has an end face and/or a radially outside lying sidewall. The support tube can be arranged inside the hollow cylindrical filter body for additionally reinforcing the filter body. The stabilization ring serves to reinforce the end disc produced by the potting compound and represents the connection between the end disc and the support tube. The stabilization ring can expediently feature a flat end face that leads into a sidewall at the outer edge, which can additionally support and protect the exterior side of the filter body.

According to an advantageous embodiment, the data storage unit can be arranged in a recess in the stabilization device. In this way, a straightforward installation of the data storage unit is possible during the production of the filter element and the alignment of the data storage unit is fixed. Also, the data storage unit is unable to change its position during the potting process and, for example, float to the surface of the potting compound.

According to an advantageous embodiment, the data storage unit can be fixed in a recess in the stabilization device before applying the potting compound. So that the data storage unit cannot float during the potting or foaming process of the plastic compound and then only floats on the surface of the potting compound, it is advantageous if the data storage unit is held firmly on or in the stabilization device. For this purpose, the stabilization device may have a possible receptacle, such as a recess, at various points for the data storage unit. In this way, the data storage unit is held firmly during the potting process and is unable to change its position.

According to an advantageous embodiment, the data storage unit can be positively arranged in the stabilization device, in particular by latching, clamping or clipping into the receptacle. Thus, the data storage unit maintains its position on or in the stabilization device during the potting process and cannot float and change its position or even float to the surface of the potting compound.

According to an advantageous embodiment, the data storage unit can be arranged on or in the radially outside lying sidewall of the stabilization ring. A favourable position for mounting the data storage unit is in or on the radially outside lying sidewall of the stabilization ring, for the data storage unit is then located closely below the outer surface of the filter element and is easily accessible for an antenna mounted outside in a filter system even if the range of the electronic communication is short.

According to an advantageous embodiment, the data storage unit can be arranged on or in the end face of the stabilization ring. An alternative mounting of the data storage unit can also be advantageously on or in the end face of the stabilization ring. After producing the end disc with the potting compound, the data storage unit is also located just below the surface and is easily readable or recordable, even if the range of electronic communication is short.

According to an advantageous embodiment, the data storage unit can be arranged on or in an outer wall of the support tube. Another convenient attachment site for the data storage unit is on or in the outer wall of the support tube. Here, too, the data storage unit is in a favourable position for the single beam characteristic of an antenna, which can, for example, be arranged on the exterior side of a filter housing.

According to an advantageous embodiment, the data storage unit can comprise an RFID transponder. RFID transponders are common, low-cost data storage units that are widely used in logistics. They do not require a built-in energy source and can be supplied with energy by an external reader for reading and/or recording. As a result, they have a theoretically unlimited service life and are easy to use.

According to an advantageous embodiment, the potting compound can preferably be foamed plastic, preferably polyurethane. End discs of filter elements, especially air filter elements, are often made of foamed plastic such as polyurethane (PUR). In this way, the sealing functions of the end disc can be achieved at affordable costs even with complex shapes. After curing, the potting compound has the necessary strength and long-term resistance, even under increased thermal stress in the environment. Manufacturing processes for such materials are to be provided at affordable costs.

According to another aspect of the invention, a filter system for filtering a fluid, in particular an air filter system, is proposed, comprising at least one filter element in a filter housing featuring at least one inlet and at least one outlet for the fluid. The filter element features a data storage unit. An antenna for electronically communicating with the data storage unit is arranged on the filter housing.

The filter system may feature a filter element with data storage unit as described above. The filter element may be exchangeably arranged in the filter housing. An antenna is arranged on the filter housing, allowing reading out from/recording to the data storage unit. The antenna is electrically connected to a suitable reading/recording device for the data storage unit.

Data that can be stored in the data storage unit can advantageously comprise production data in the as-delivered state of the filter element, such as batch number etc., to identify the filter element. However, operating data such as running time, machine type, load status and the like can also be stored in it. In this way, the data can be read out by the filter element and sent, for example, to the engine control unit of an internal combustion engine in order to adapt the engine control accordingly. The reading/recording device for the data storage unit can advantageously be integrated into the engine control unit. For example, filter elements with lower performance can be identified and the running time until the next maintenance can be adjusted accordingly.

According to an advantageous embodiment, the antenna can be ring-shaped. Such a round antenna has a favourable radiation characteristic allowing to reliably read out from and/or record to the data storage unit, which may be a few centimeters away, with sufficient field strength.

According to an advantageous embodiment, the antenna can be arranged concentrically around a longitudinal axis of the filter element. Quite advantageously, this allows electronic communication with a data storage unit, which is arranged in one of the positions described above in the filter element inserted in the filter housing in any rotating position. As a result, sufficient field strengths can advantageously be obtained for reading out from and/or recording to the data storage unit. The antenna and/or the data storage unit or the receptacle is preferably arranged in such a way that the field lines cross the data storage unit transversely, i.e. in the direction of the narrow or flat side of the data storage unit. In the case of a coin-shaped data storage unit this means at an obtuse angle, preferably substantially perpendicular to the flat surfaces of the coin shape, in the case of a rod-shaped data storage unit at an obtuse angle, in particular substantially perpendicular to its longitudinal extension. In this way, a good connection to an antenna of the data storage unit can be achieved, the orientation of which usually corresponds to the outer shape or housing shape of the data storage unit.

According to an advantageous embodiment, the antenna can be arranged concentrically on an end face of the filter housing. In particular, an antenna mounted in this way can be used for convenient electronic communication with a data storage unit, which is arranged on the end disc of the filter element, which is arranged in the filter housing facing this end face. As a result, sufficient field strengths can advantageously be obtained for reading out from and/or recording to the data storage unit.

According to an advantageous embodiment, the antenna can encompass the outlet. Since the outlet with the embodiment of a filter element having a pure fluid flow guided centrally inside the filter body can be arranged on one end face of the filter element, an antenna mounted in this way can be used for convenient electronic communication with a data storage unit. As a result, sufficient field strengths can advantageously be obtained for reading out from and/or recording to the data storage unit.

According to another aspect of the invention, a method of producing a filter element for a filter system is proposed, wherein the filter element features a data storage unit. The method comprises at least the steps:

Joining a filter body with at least one stabilization device,
Arranging the data storage unit on or in the stabilization device,
Forming an end disc on at least one end face of the filter body by at least partially overmoulding the stabilization device with a potting compound, wherein the data storage unit is at least partially surrounded by the potting compound.

With the method according to the invention, the hollow cylindrical filter body, for example, is expediently applied to the support tube of the stabilization device. Before or after applying the filter body, the data storage unit can be arranged in the stabilization device, for example in a receptacle or recess of the stabilization device. The end disc can then be produced by casting with the potting compound or by foaming a plastic. The stabilizing device is at least partially overmoulded/foamed with the potting compound. The attachment site of the data storage unit in the stabilization device is selected so that the data storage unit is at least partially surrounded by the potting compound and thus remains firmly connected to the filter element after curing of the potting compound.

According to an advantageous embodiment, overmoulding of the stabilization device can be carried out by foaming a plastic. End discs of filter elements, especially air filter elements, are often made of foamed plastic such as polyurethane (PUR). In this way, the sealing functions of the end disc can also be achieved at affordable costs even with complex shapes. After curing, the potting compound has the necessary strength and longterm resistance, even under increased thermal stress in the environment. Manufacturing processes for such materials are to be provided at affordable costs.

According to an advantageous embodiment, the data storage unit can be positively inserted into the stabilization device, in particular by latching, clamping or clipping into the receptacle. Thus, the data storage unit maintains its position on or in the stabilization device during the potting process and cannot float and change its position, or even float to the surface of the potting compound.

BRIEF DESCRIPTION OF DRAWINGS

Further advantages will become apparent from the following drawing description. The drawings show examples of an embodiment of the invention. The drawings, the description and the claims contain numerous features in combination. A person of skill in the art will expediently consider the features also individually and combine them to other meaningful combinations. Examples are shown in:

DETAILED DESCRIPTION

Figure 1:
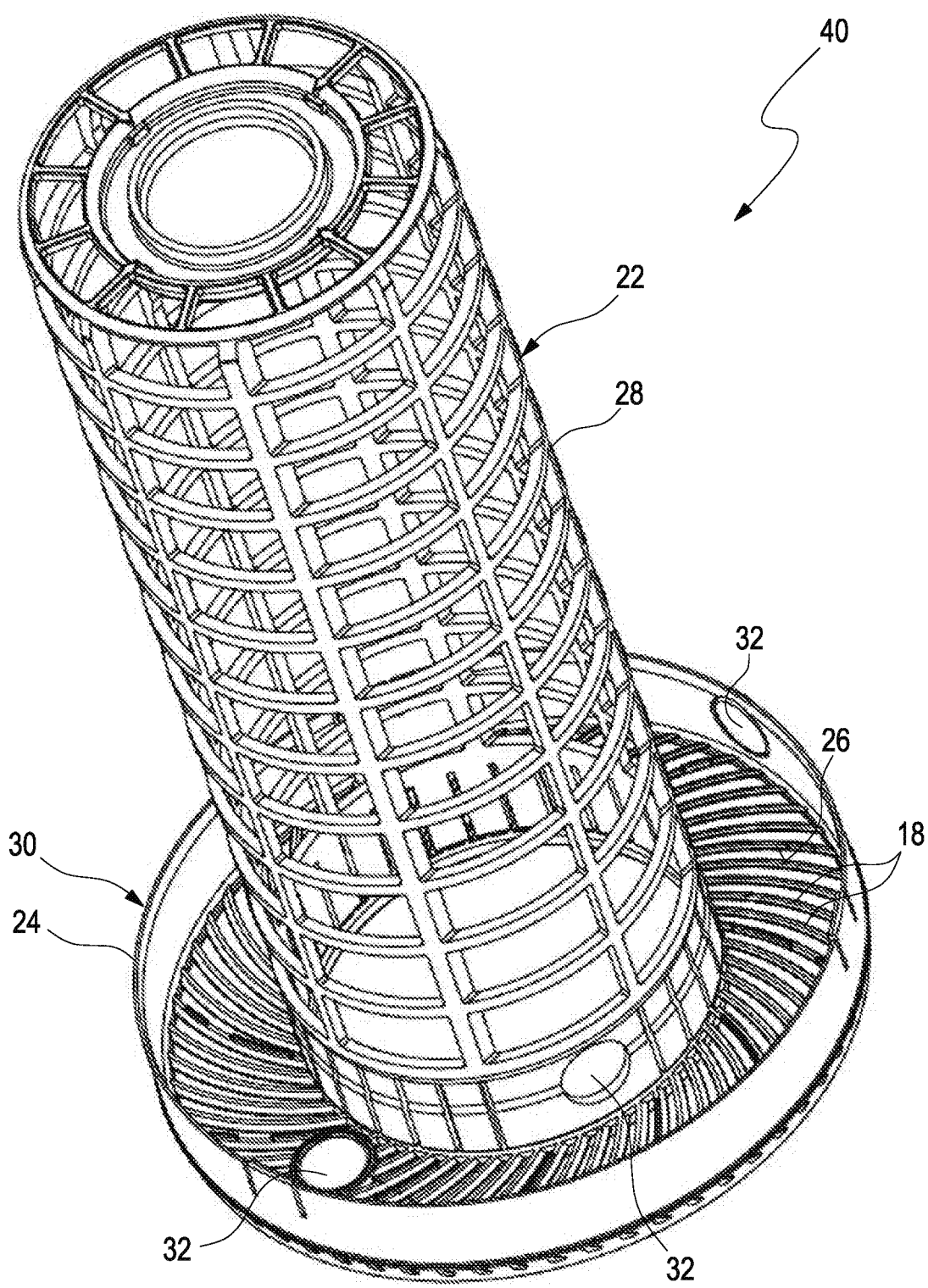
FIG. 1 an example of an embodiment of a stabilization device with possible recesses for arranging a data storage unit according to an embodiment of the invention in isometric representation.

Identical or similar components in the figures have the same reference numerals. The figures only show examples and are not to be understood in a restrictive way.

FIG. 1 shows an example of an embodiment of a stabilization device 40 with possible recesses 32 for arranging a data storage unit 20 according to an embodiment of the invention in isometric representation. The stabilization device 40 features a central support tube 22 at one end of which a stabilization ring 30 is arranged that opens towards the support tube 22. The stabilization ring 30 features an end face 26, which is closed off radially outside lying by a side wall 24. The end face 26 is formed by stabilizing struts 18, which connect the central area of the support tube 22 to the sidewall 24.

The stabilization device is made of plastic. In the end face 26, in the side wall 24 and in the area of the support tube 22 adjacent to the stabilization ring 30, recesses 32 are arranged for mounting a data storage unit 20, which is not shown in the figure. The data storage unit 20 can, for example, be clipped or glued into the corresponding recess 32 serving as a receptacle for the data storage unit 20 and is thus securely fixed for the subsequent potting process.

Figure 2:
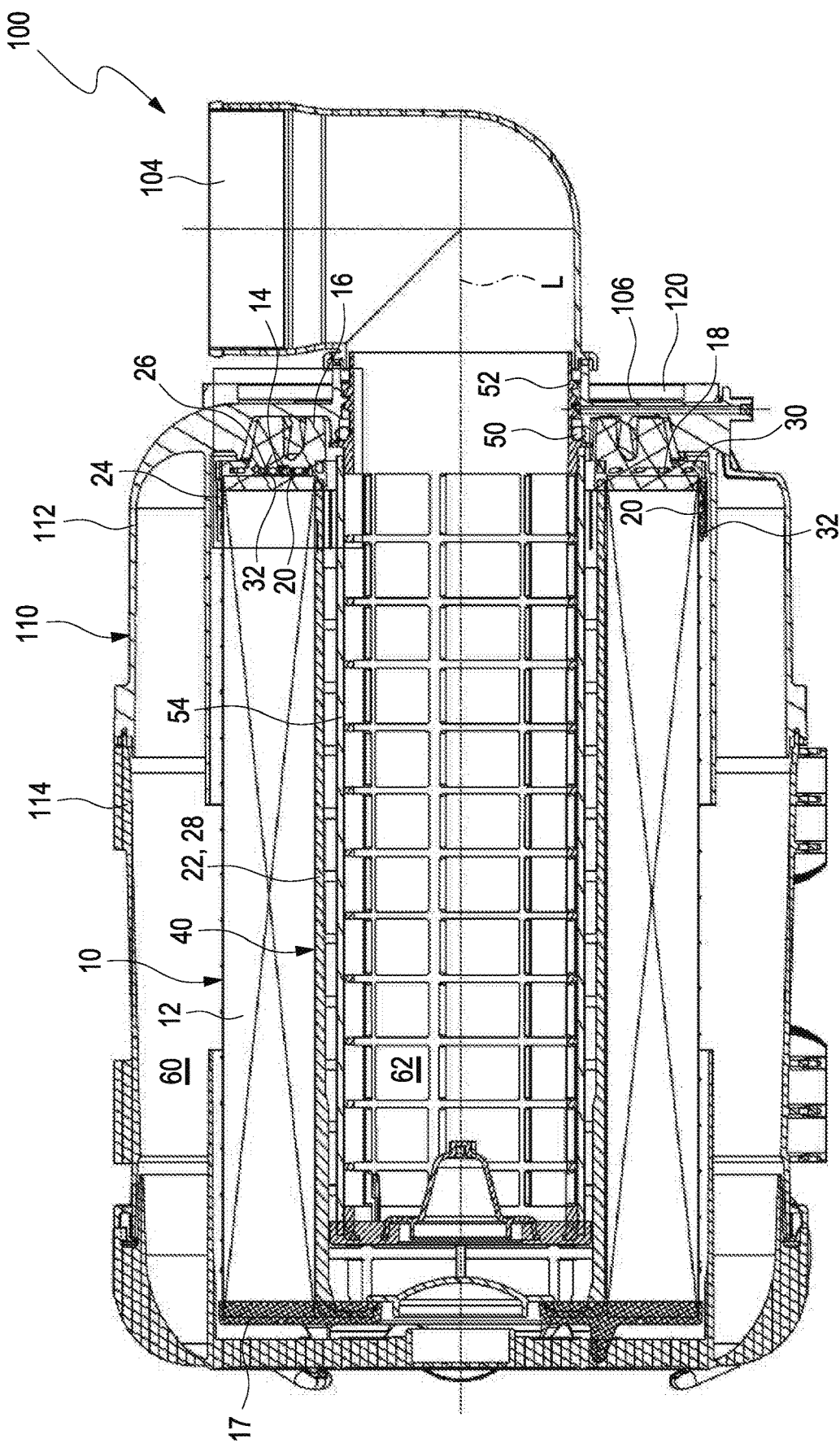
FIG. 2 a longitudinal section through a filter system according to an embodiment of the invention with inserted filter element.

FIG. 2 shows a longitudinal section through a filter system 100 according to an embodiment of the invention with inserted filter element 10. The filter system 100, which is designed as an air filter system, features a filter housing 110, which comprises two housing components 112, 114, in which the filter element 10 is arranged fluid-tightly between a raw side 60 and a clean side 62. The filter housing 110 features an inlet 102 concealed in the representation and a central outlet 104 for the fluid. The raw fluid flows towards the filter element 10 radially from the outside, which is filtered by the filter body 12 and discharged centrally inside the filter body 12 as clean fluid into the outlet 104.

The filter element 10 is closed on one end face 14 by an end disc 16, which is, similar to the opposite end disc 17, formed from a potting compound. The filter element 10 is supported in the filter housing 110 by both end discs 16, 17, which are provided with supporting elements by appropriate shaping during the potting process, inside the filter housing 110. A radial circumferential seal 50 is provided for sealing between clean side 62 and raw side 60 of the filter system 100. The seal 50 is fitted between a transition piece 52, which connects the central tube 54 and the outlet 104, and the filter housing 110. The central tube 54 is located centrally inside the filter element.

The filter element 10 features a stabilization device 40 which is at least partially surrounded by the potting compound. At least one data storage unit 20, for example an RFID transponder, which is surrounded at least partially by the potting compound, is arranged on or in the stabilization device 40. FIG. 2 shows a possible position of a data storage unit 20 in a recess 32 on the end face 26 of the stabilization ring 30 as well as on the radially outside lying sidewall 24 of the stabilization ring 30. Both positions are only alternatives. Only one data storage unit 20 is required to implement the function. The data storage unit 20 is positively arranged in the recess 32 of the stabilization device 40 before overmoulding it with the potting compound, thus fixing it before applying the potting compound. As an alternative, the data storage unit 20 can also be arranged on or in an outer wall 28 of the support tube 22.

The potting compound can advantageously comprise foamed plastic such as polyurethane (PUR). The stabilization device 40 can thus be at least partially overmoulded or foamed with the potting compound to form the end disc 16. Since the data storage unit 20 is arranged in or on the stabilization device, it can be expediently overmoulded or foamed.

The method for producing the filter element 10 comprises at least the steps:
Joining of the filter body 12 with at least the stabilization device 40,
Arranging the data storage unit 20 on or in the stabilization device 40, and finally
Forming the end disc 16 on at least the end face 14 of the filter body 12 by at least partially overmoulding the stabilization device 40 with the potting compound, wherein the data storage unit 20 is at least partially surrounded by the potting compound.

The overmoulding of the stabilization device 40 can advantageously be carried out by foaming a plastic. The data storage unit 20 is positively inserted into the stabilization device 40 before overmoulding so that it cannot float when overmoulding it with the potting compound.

An antenna 120 for electronically communicating with the data storage unit 20 is arranged on the filter housing 110. The antenna 120 is ring-shaped and arranged on the end face 106 of the filter housing 110 around the longitudinal axis L, encompassing the outlet 104. In this way, a sufficient field strength for electronically communicating with the data storage unit 20 can be achieved in both installation positions shown.

Figure 3:
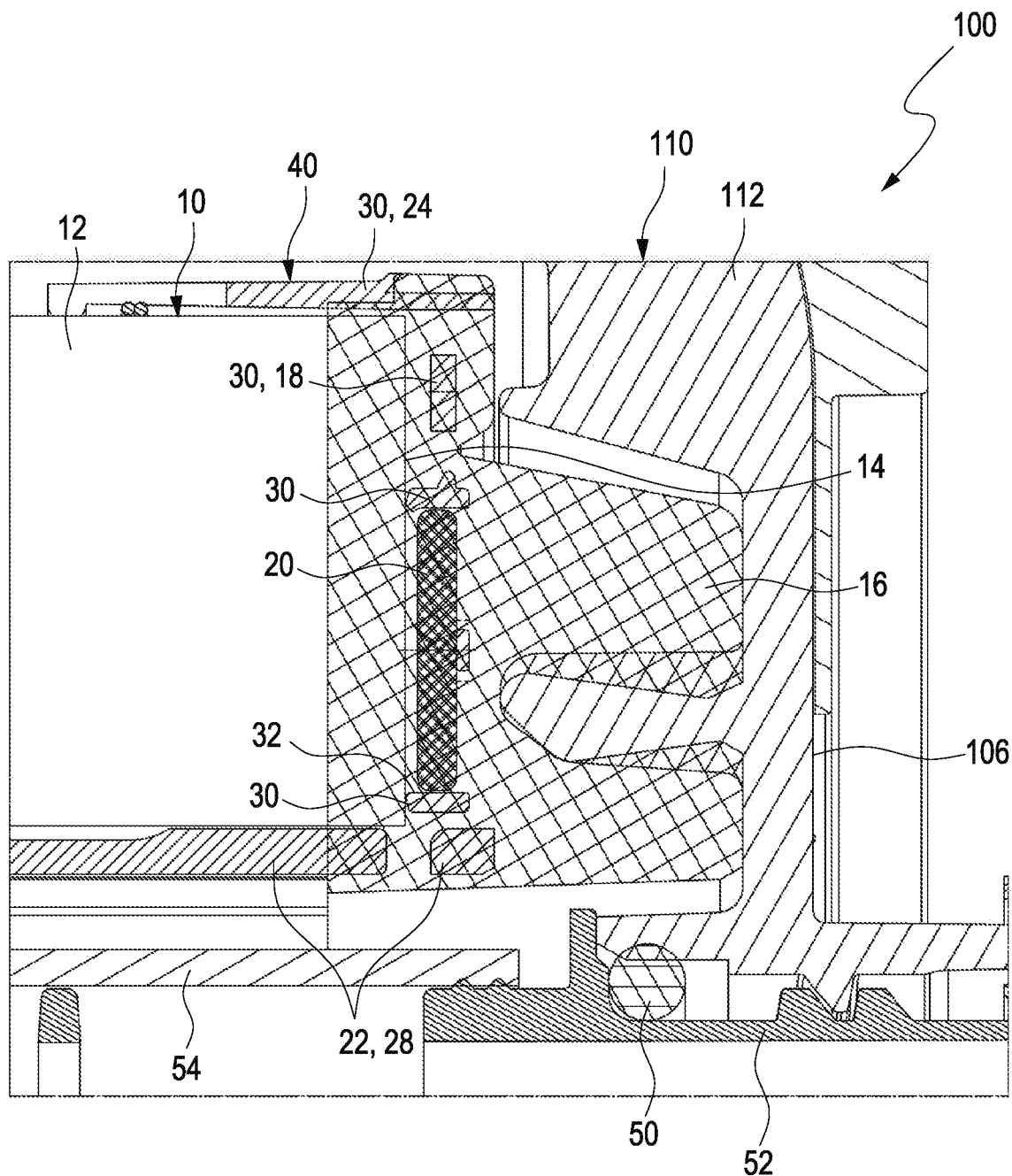
FIG. 3 a detailed view of the end disc of the filter element according to FIG. 2.

FIG. 3 shows a detailed view of the end disc 16 of the filter element 10 according to FIG. 2. The complete embedding of the data storage unit 20 into the overmoulded end disc 16 is clearly visible in this example. The stabilization device 40 with stabilization ring 30 consisting of stabilizing struts 18 and sidewall 24 accommodates the data storage unit 20 in the recess 32. The stabilization device 40 continues in the support tube 22, which protrudes from the cast end disc 16. Inside the support tube 22, the central tube 54 can be seen, which leads into the transition piece 52, which is sealed with the seal 50 against the first housing component 112.

Figure 4:
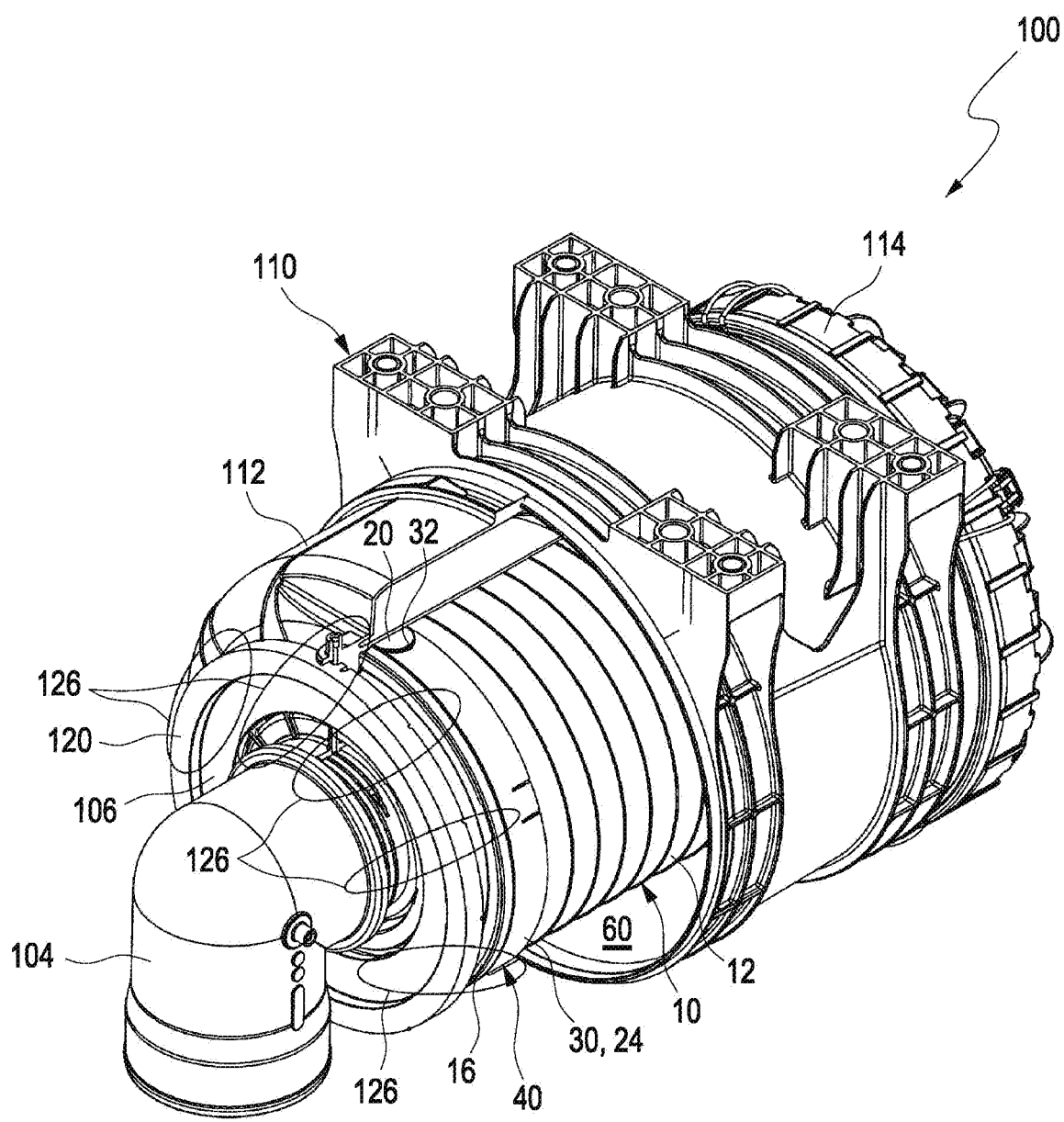
FIG. 4 the filter system according to FIG. 2 in isometric representation with partially cut filter housing.

FIG. 4 shows the filter system 100 according to FIG. 2 in isometric representation with partially cut filter housing 110. The first housing component 112 is cut in half so that the filter element 10 arranged inside can be seen. The round antenna 120 is arranged radially outside around the outlet 104 on the end face 106 of the first housing component 112. Schematically, FIG. 4 shows magnetic field lines 126 to illustrate the radiation characteristics of the antenna 120. If a current flows in the round antenna 120, the magnetic field lines 126 encompass the round antenna 120 with the current direction clockwise. Thus, it can be seen that the data storage unit 20 arranged in the sidewall 24 of the stabilization ring 30 is located in the area of the field lines 126, which enables the electronic communication between antenna 120 and data storage unit 20 in a favourable way.

Figure 5:
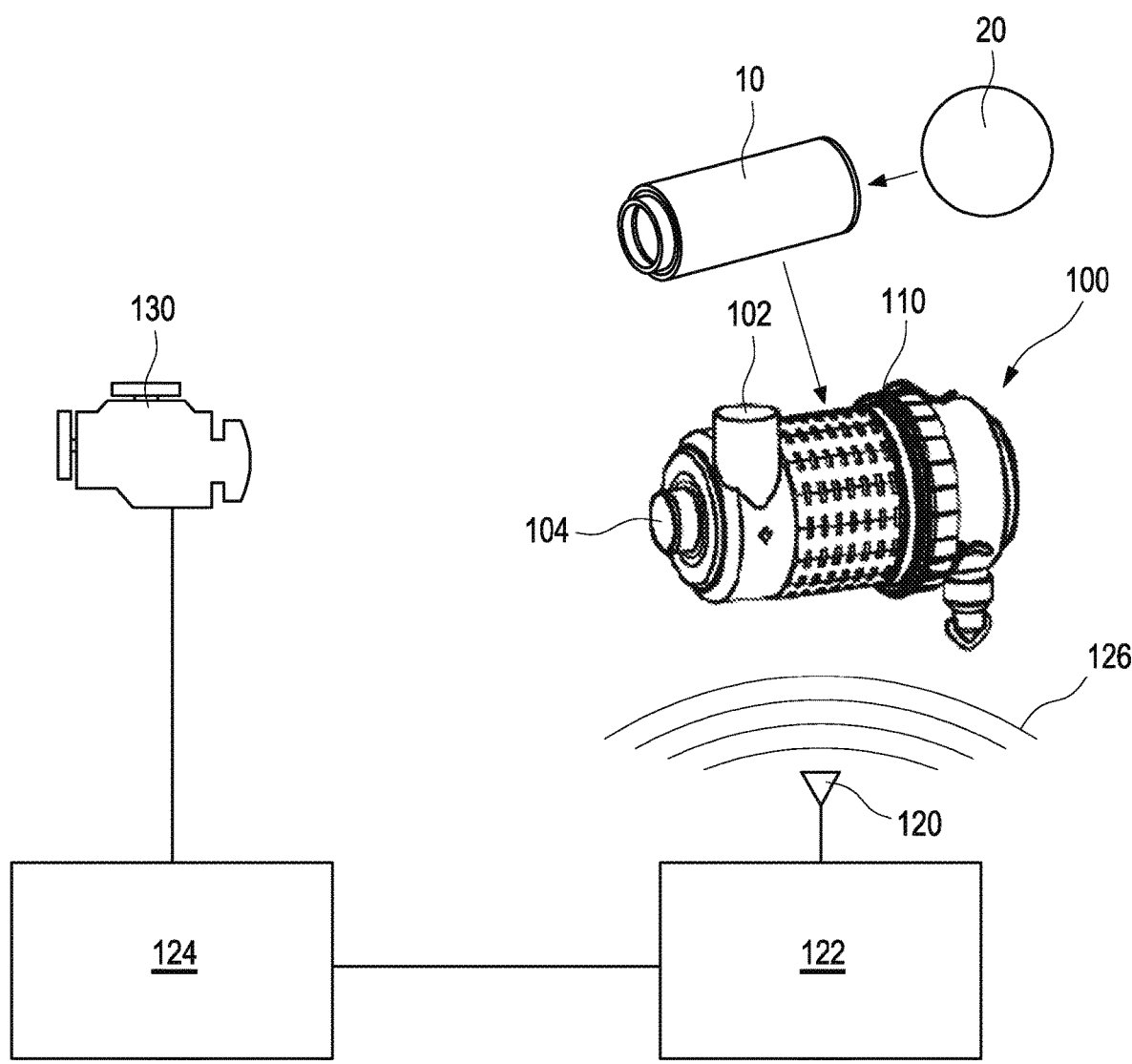
FIG. 5 an overview of an overall system for electronically communicating between the data storage unit and the internal combustion engine according to an embodiment of the invention.

FIG. 5 shows an overview of an overall system for electronically communicating between the data storage unit 20 and the internal combustion engine 130 according to an embodiment of the invention. The individual components of the overall system are shown schematically and not to scale. The filter system 100 is divided into the components filter housing 110, filter element 10 and data storage unit 20. The antenna 120 is not located directly on the filter housing 110, but is indicated as nearby, at least so close that the antenna 120 can establish with the field lines 126 the electronic communication to the data storage unit 20. The signals read out from the data storage unit 20 can then be recorded with the reading/recording device 122 and forwarded to the engine control unit 124. There the data can be processed further and forwarded to sensors and actuators of the internal combustion engine 130.

Data that can be stored in the data storage unit 20 can advantageously comprise production data in the as-delivered state of the filter element 10, such as batch number etc., to identify the filter element 10. However, operating data such as running time, machine type, load status and the like can also be stored in it. Thus, the control of the engine 130 can be adapted accordingly. The reading/recording device 122 for the data storage unit 20 can advantageously be integrated into the engine control unit 124.

What is claimed is:
1. A filter element for filtering a fluid, comprising:
a filter body which is closed on at least one end face by an end disc;
wherein the end disc is formed from a potting compound;
a stabilization device surrounded by the potting compound of the end disc;

wherein at least one contactless readable data storage unit is arranged in the stabilization device and is at least partially surrounded by the potting compound, wherein the stabilization device has a central support tube at one end of which a stabilization ring is arranged that opens towards the central support tube;

wherein the stabilization ring has an end face and-a radially outside lying sidewall of the stabilization ring, arranged radially outwardly away from the central support tube, wherein the stabilization device having the central support tube and the stabilization ring is a plastic component;

wherein the stabilization ring has formed therein a receptacle configured to receive and hold the at least one contactless readable data storage unit in the stabilization ring;

wherein the stabilization ring receptacle is formed with clamping or latching elements which are elastically deformable to clamp and hold the at least one contactless readable data storage unit in the stabilization ring receptacle;

wherein the at least one contactless readable data storage unit is clamped into the receptacle before introducing the potting compound to embed the at least one contactless readable data storage unit in the stabilization ring, the embedding thereby forming the end disc with the at least one contactless readable data storage embedded therein, with the stabilization ring stabilizing the end disc.

2. The filter element according to claim 1, wherein at least one of the at least one contactless readable data storage unit is arranged on or within the radially outside lying sidewall of the stabilization ring.

3. The filter element according to claim 1, wherein at least one of the at least one contactless readable data storage unit is arranged on or in an outer wall of the support tube.

4. The filter element according to claim 1, wherein the at least one contactless readable data storage unit comprises
a RFID transponder.

5. The filter element according to claim 1, wherein the potting compound is a foamed polyurethane.

6. An air filter system, comprising:
at least one filter element according to claim 1;
a filter housing in which the at least one filter element is arranged, the filter housing having an inlet and an outlet for the fluid;
wherein the filter element includes the at least one contactless readable data storage unit; and
wherein an antenna for electronically communicating with the at least one contactless readable data storage unit is arranged on the filter housing.

7. The air filter system according to claim 6, wherein the antenna is ring-shaped and arranged on one end face of the filter housing, the antenna arranged annularly around a longitudinal axis of the filter housing.

8. The air filter system according to claim 7, wherein the antenna is arranged to encompass the outlet.

9. A method for producing the filter element according to claim 1 for a filter system, wherein
the filter element includes the at least one contactless readable data storage unit; and wherein the method comprises at least the steps:
providing the stabilization device having the central tube and the stabilization ring, the stabilization ring having the receptacle formed therein;
elastically deforming the latching or clamping elements of the stabilization ring to clamp the at least one contactless readable data storage unit in the stabilization ring receptacle;
joining of the filter body with the stabilization device;
forming the end disc on at least one end face of the filter body by overmolding the stabilization ring with the potting compound;
wherein the at least one contactless readable data storage unit is at least partially surrounded by the potting compound.

* * * * *